United States Patent
Maekawa (10) Patent No.: US 10,808,087 B2
(45) Date of Patent: Oct. 20, 2020

(54) FIBER COMPOSITE MATERIAL AND METHOD OF PRODUCING THE SAME

(71) Applicant: TOYOTA BOSHOKU KABUSHIKI KAISHA, Aichi-ken (JP)

(72) Inventor: Motoki Maekawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 23 days.

(21) Appl. No.: 16/203,880

(22) Filed: Nov. 29, 2018

(65) Prior Publication Data

US 2019/0169380 A1   Jun. 6, 2019

(30) Foreign Application Priority Data

Dec. 1, 2017 (JP) .................................. 2017-231533

(51) Int. Cl.
*C08J 5/04* (2006.01)

(52) U.S. Cl.
CPC .............. *C08J 5/045* (2013.01); *C08J 5/046* (2013.01); *C08J 5/047* (2013.01); *C08J 2323/12* (2013.01); *C08J 2323/26* (2013.01); *C08J 2467/06* (2013.01); *C08J 2477/00* (2013.01)

(58) Field of Classification Search
CPC ... C08J 5/045; C08J 5/046; C08J 5/047; C08J 2323/12; C08J 2323/26; C08J 2467/06; C08J 2477/00
See application file for complete search history.

(56) References Cited

U.S. PATENT DOCUMENTS

| | | | |
|---|---|---|---|
| 2010/0056699 A1* | 3/2010 | Dobashi | C08J 5/046 524/528 |
| 2011/0006454 A1 | 1/2011 | Kawashiri | |
| 2016/0264776 A1* | 9/2016 | Wolfe | C08J 5/046 |
| 2017/0022642 A1* | 1/2017 | Pan | C08J 5/005 |
| 2019/0315954 A1* | 10/2019 | Lummerstorfer | C08K 7/02 |

FOREIGN PATENT DOCUMENTS

| | | | | |
|---|---|---|---|---|
| JP | H0811131 B2 * | 2/1996 | | C08L 77/00 |
| JP | 2009-234129 | 10/2009 | | |
| WO | WO-2014001340 A1 * | 1/2014 | | B32B 5/26 |
| WO | WO-2015185573 A1 * | 12/2015 | | C08J 5/045 |

OTHER PUBLICATIONS

English-language machine translation of JP-H0811131-B2, performed on Espacenet, Feb. 12, 2020.*
English-language machine translation of WO-2014001340-A1, performed on Espacenet, Feb. 12, 2020.*
English-language machine translation of WO-2015185573-A1, performed on Espacenet, Feb. 12, 2020.*
Gottfried W. Ehrenstein & Josef Kabelka, "Reinforced Plastics," in 31 Ullmann's Encyclopedia of Industrial Chemistry 453, published online 2000.*

* cited by examiner

*Primary Examiner* — Nicholas E Hill
(74) *Attorney, Agent, or Firm* — Greenblum & Bernstein, P.L.C.

(57) ABSTRACT

A fiber composite material includes mixed fibers including a plant fiber and an ultrahigh-strength elongation fiber and thermoplastic resin that binds the mixed fibers each other. The ultrahigh-strength elongation fiber has tensile modulus that is 4000 MPa or greater and is greater than tensile modulus of the thermoplastic resin and has tensile elongation at break that is greater than tensile elongation at break of the plant fiber.

15 Claims, 4 Drawing Sheets

| | KENAF FIBER (% BY WEIGHT) | THERMOPLASTIC RESIN | | ULTRAHIGH-STRENGTH ELONGATION FIBER | | TENSILE MODULUS (MPa) | TENSILE ELONGATION AT BREAK (%) | CHARPY IMPACT TOUGHNESS (kJ/m²) | SHOCK RESISTANCE PROPERTY |
|---|---|---|---|---|---|---|---|---|---|
| | | NON-ACID-MODIFIED PP (% BY WEIGHT) | ACID-MODIFIED PP (% BY WEIGHT) | PET FIBER (% BY WEIGHT) | META-ARAMID FIBER (% BY WEIGHT) | | | | |
| COMPARATIVE EXAMPLE 1 | 50.0 | 47.5 | 2.5 | 0.0 | 0.0 | 2021 | 1.5 | 9 | BAD |
| COMPARATIVE EXAMPLE 2 | 50.0 | 50.0 | 0.0 | 0.0 | 0.0 | 1880 | 2.0 | 13 | BAD |
| EXAMPLE 1 | 50.0 | 42.7 | 2.3 | 5.0 | 0.0 | 2000 | 7.0 | 20 | NOT BAD |
| EXAMPLE 2 | 50.0 | 38.0 | 2.0 | 10.0 | 0.0 | 2010 | 12.0 | 26 | GOOD |
| EXAMPLE 3 | 50.0 | 33.4 | 1.6 | 15.0 | 0.0 | 2025 | 21.0 | 30 | EXCELLENT |
| EXAMPLE 4 | 50.0 | 23.8 | 1.2 | 25.0 | 0.0 | 2037 | 24.8 | 33 | EXCELLENT |
| EXAMPLE 5 | 50.0 | 33.4 | 1.6 | 0.0 | 15.0 | 2077 | 18.0 | 28 | GOOD |

US 10,808,087 B2

FIBER COMPOSITE MATERIAL AND METHOD OF PRODUCING THE SAME

CROSS REFERENCE TO RELATED APPLICATION

This application claims priority from Japanese Patent Application No. 2017-231533 filed on Dec. 1, 2017. The entire contents of the priority application are incorporated herein by reference.

TECHNICAL FIELD

The present disclosure relates to a fiber composite material and a method of producing the same.

BACKGROUND

There has been known a method of producing a plant fiber composite material that includes plant fibers bound together with a thermoplastic resin. In such a plant fiber composite material, a thermoplastic resin containing an acid-modified thermoplastic resin is used. With such a method of producing a plant fiber composite material, a fiber areal weight necessary for obtaining good mechanical characteristics can be reduced and a lightweight plant fiber composite material can be obtained.

SUMMARY

The fiber composite material has been highly demanded and various kinds of properties are demanded at a high standard. To further reduce the weight of the fiber composite material containing plant fibers like the above-described plant fiber composite material, a technology of improving a shock resistance property while keeping rigidity of the fiber composite material has been demanded.

An object of the present technology is to provide a technology of improving a shock resistance property while keeping rigidity of a fiber composite material.

The present inventor paid attention to following effects. In the fiber composite material having a good binding property of the plant fiber and the thermoplastic resin, the high tensile modulus of the plant fiber contributes to the improvement of rigidity of the fiber composite material and also lowers the shock resistance property of the fiber composite material. Furthermore, the present inventor assumes that in such a fiber composite material, the binding property of the plant fiber and the thermoplastic resin is good and therefore, the elongation property of the thermoplastic resin having nominal tensile strain at break greater than tensile elongation at break of the plant fiber is not effectively utilized and the tensile elongation at break of the fiber composite material is restricted to a level close to the tensile elongation at break of the plant fiber. The present inventor has enthusiastically studied and reached the technology described herein.

A fiber composite material according to the technology described herein includes mixed fibers including a plant fiber and an ultrahigh-strength elongation fiber and thermoplastic resin that binds the mixed fibers each other. The ultrahigh-strength elongation fiber has tensile modulus that is 4000 MPa or greater and is greater than tensile modulus of the thermoplastic resin and has tensile elongation at break that is greater than tensile elongation at break of the plant fiber.

DETAILED DESCRIPTION

One embodiment of the present technology will be described with reference to FIGS. 1 to 4. In this embodiment section, a fiber composite material 10 used for a vehicular interior component will be described. The fiber composite material 10 having an excellent shock resistance property is effectively used for a vehicular door trim mounted beside an occupant of a vehicle or an instrumental panel mounted on a front side of an occupant.

Figure 1:
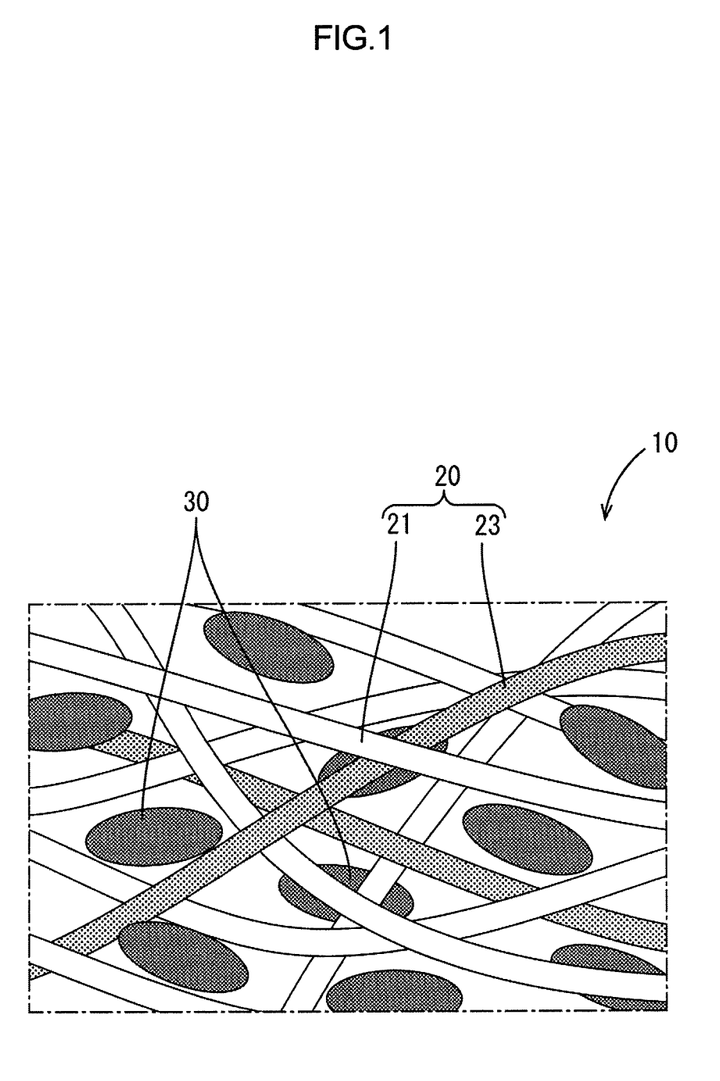
FIG. 1 is a typical view illustrating a fiber composite material.

As illustrated in FIG. 1, the fiber composite material 10 includes mixed fibers 20 and a thermoplastic resin 30 that binds the mixed fibers 20. The mixed fibers 20 include a plant fiber 21 and an ultrahigh-strength elongation fiber 23. The fiber composite material 10 has a structure of a fiber reinforced resin that includes the thermoplastic resin 30 as a mother material and the mixed fibers 20 as reinforcing fibers. The fiber composite material 10 has a board shape that is molded with press molding. The plant fibers 21 and the ultrahigh-strength elongation fibers 23 are entangled together and have an orientation of extending substantially along a plate surface of the board shape of the fiber composite material 10. Tensile properties of the fiber composite material 10 are measured with the testing method based on JIS K7161 unless otherwise noted. Tensile properties of a fiber itself are measured with the testing method based on JIS L1013 unless otherwise noted. Hereinafter, the thermoplastic resin 30 that is the mother material of the fiber composite material 10, the plant fiber 21, and the ultrahigh-strength elongation fiber 23 will be described.

The thermoplastic resin 30 is not particularly limited as long as it is thermoplastic and various kinds of thermoplastic resins may be used. Examples of the thermoplastic resins include a polyolefin, a polyester resin, polystyrene, an acrylic resin that is obtained using a methacrylate and/or acrylate, a polyamide resin, a polycarbonate resin, a polyacetal resin, an ABS resin, and the like. Among these, examples of the polyolefin include polypropylene, polyethylene, ethylene propylene copolymer (ethylene propylene block copolymer, ethylene propylene random copolymer) and the like. Examples of the polyester resin include an aliphatic polyester resin such as polylactic acid, polycaprolactone and polybutylene succinate, and an aromatic polyester resin such as polyethylene terephthalate, polytrimethylene terephthalate and polybutylene terephthalate, and the like. One of the thermoplastic resins may be used and two or more than two of them may be used in combination.

In this embodiment, the thermoplastic resin 30 is a resin that has thermoplasticity and contains an acid-modified thermoplastic resin. Other thermoplastic resins than the acid-modified thermoplastic resin are referred to as non-acid-modified thermoplastic resin. The acid-modified thermoplastic resin is a thermoplastic resin in which an acid-modified group is introduced by acid modification. The acid-modified group introduced into the thermoplastic resin is not particularly limited and is usually an anhydrous carboxylate residue (—CO—O—OC—) and/or a carboxylate residue (—COOH). The acid modified group may be introduced by any compounds, and the compounds include maleic anhydride, itaconic acid anhydride, succinic anhydride, glutaric acid anhydride, adipic acid anhydride, maleic acid, itaconic acid, fumaric acid, acrylic acid, methacrylic acid, and the like. The compound may be used singly or in combination of two or more types thereof. Among these, maleic anhydride and itaconic acid anhydride are preferable, and maleic anhydride is particularly preferred.

Furthermore, a thermoplastic resin that is a skeleton of the acid-modified thermoplastic resin is not particularly limited and various kinds of thermoplastic resins may be used. Examples of the thermoplastic resins include a polyolefin, a polyester resin, polystyrene, an acrylic resin that is obtained using a methacrylate and/or acrylate, a polyamide resin, a polycarbonate resin, a polyacetal resin, an ABS resin, and the like. Among these, examples of the polyolefin include polypropylene, polyethylene, ethylene propylene random copolymer, and the like. Examples of the polyester resin include an aliphatic polyester resin such as polylactic acid, polycaprolactone and polybutylene succinate, and an aromatic polyester resin such as polyethylene terephthalate, polytrimethylene terephthalate and polybutylene terephthalate, and the like.

The thermoplastic resin that is the skeleton of the acid-modified thermoplastic resin, and the non-acid-modified thermoplastic resin may be the same (homogeneous) or different (heterogeneous). It is preferred that both of them are the same, and are polyolefins. The polyolefin is easy to be used and enables to improve the productivity. Additionally, high flexibility and excellent formability can be obtained. Among the polyolefin, a polypropylene, polyethylene, ethylene propylene copolymer, and a mixed resin (alloy) of polypropylene and polyethylene are preferable. As the non-acid-modified thermoplastic resin, a polypropylene and the above-mentioned mixed resin are particularly preferred. As the skeletal thermoplastic resin of the acid-modified thermoplastic resin, a polypropylene is particularly preferred.

The content amount of the acid-modified thermoplastic resin is preferably 15% or less by weight (usually 0.3% or more by weight) based on 100% by weight of the total amount of the thermoplastic resin 30. When the amount is in this range, the fiber can be smoothly spun, as well as the combination use with the non-acid-modified thermoplastic resin can effectively improve the mechanical characteristics of the molded article (the fiber composite material 10) to be obtained. This amount of the acid-modified thermoplastic resin is preferably in the range from 0.5% to 15% by weight, more preferably from 1% to 10% by weight, especially from 2% to 7% by weight, and particularly from 3% to 7% by weight. Further superior advantages can be obtained in these preferable ranges, respectively.

In this embodiment, the thermoplastic resin 30 includes polypropylene (hereinafter, referred to as non-acid-modified PP) and maleic anhydride modified polypropylene (hereinafter, referred to as acid-modified PP). The thermoplastic resin 30 has tensile modulus of about from 1000 MPa to 1800 MPa and nominal tensile strain at break of about 20%.

In the fiber composite material 10, the amount of the plant fibers 21 is in the range from 30% to 95% by weight based on 100% by weigh of the total amount of the mixed fibers 20 and the thermoplastic resin 30. In this range, excellent formability can be obtained in the fiber composite material 10 and the fiber composite material 10 can be reduced in weight and keep good rigidity. The amount of the plant fibers 21 is preferable in the range from 40% to 85% by weight based on 100% by weight of the total amount of the mixed fibers 20 and the thermoplastic resin 30 and especially in the range from 45% to 75% by weight. Further superior advantages can be obtained in these preferable ranges, respectively.

The plant fiber 21 is a fiber derived from a plant. The plant fiber may be a fiber obtained from various kinds of plants such as kenaf, jute hemp, manila hemp, sisal hemp, gampi, Mitsumata, Kozo, banana, pineapple, coconut, corn, sugarcane, bagasse, palm, papyrus, reed grass, esparto, Sabi grass, oat, rice plant, bamboo, various conifer trees (Japanese cedar, Japanese cypress, and others), broad leaf tree, cotton and others. The plant fiber may be used singly or in combination of two or more types thereof. Among these, kenaf is preferred. Kenaf is a very fast growing annual grass and the excellent absorbing property of carbon dioxide so that it can contribute to reducing an amount of carbon dioxide in the air, thus effectively utilizing forest resources and others. The segment of the plant used as the plant fiber is not particularly limited so long as the segment comprises a segment constituting the plant such as non-woody parts, stalk section, root parts, leaf parts and woody parts. Furthermore, only a specific segment thereof may be used as a different segment with two parts of more may be used.

The average fiber length, the average fiber diameter and the like of the plant fibers 21 are not particularly limited. The average fiber length thereof is preferably 10 mm or longer. When the average fiber length of the plant fibers 21 is in this range, the mixed fibers 20 (the plant fibers 21 and the ultrahigh-strength elongation fibers 23) are easily fiber-mixed (in particular, formation of entanglement of fibers is easy) and are easily mixed with thermoplastic resin fibers 31, which will be described later. The resultant fiber composite material 10 can exert excellent mechanical characteristics. The average fiber length is more preferably in the range from 10 mm to 150 mm, further preferably from 20 mm to 100 mm, and particularly from 30 mm to 80 mm. Further superior advantages can be obtained in these preferable ranges, respectively. The average fiber length is an average value of a total of 200 fibers by taking out a single fiber one by one at random and actually measuring a fiber length of each single fiber with a ruler without being stretched in the direct method according to JIS L 1015.

The average fiber diameter of the thermoplastic resin fiber is preferably 1 mm or shorter. When the average fiber diameter of the thermoplastic resin fiber is in this range, the resultant fiber composite material 10 can exert excellent mechanical characteristics. The average fiber diameter thereof is more preferably in the range from 0.01 mm to 1 mm, further preferably from 0.05 mm to 0.7 mm, and particularly from 0.07 mm to 0.5 mm. Further superior advantages can be obtained in these preferable ranges, respectively. The fiber diameter is a value (t) obtained by measuring the fiber diameter at the middle of the longitudinal direction of the fiber whose length is measured using an optical microscope.

The tensile modulus of the plant fiber 21 is preferably in the range from 10000 MPa to 40000 MPa and is larger than that of the thermoplastic resin 30, which will be described later. The elastic modulus of the fiber composite material is generally represented by a total value of the values obtained by multiplying the tensile modulus of each component included in the fiber composite material and a volume ratio of the corresponding component. Therefore, the plant fiber 21 having higher tensile modulus compared to that of the thermoplastic resin 30 contributes to improvement of the tensile modulus of the fiber composite material 10. On the other hand, tensile elongation at break of the plant fiber 21 is about 2.5% and the plant fiber 21 has tensile elongation at break that is smaller than nominal tensile strain at break of the thermoplastic resin 30.

In the fiber composite material 10, the amount of the ultrahigh-strength elongation fiber 23 is 30% by weight or smaller based on 100% by weigh of the total amount of the mixed fibers 20 and the thermoplastic resin 30. An upper limit value of the amount of the ultrahigh-strength elongation fiber 23 is preferably 30% by weight or smaller and further preferably 25% by weight or smaller in view of the lightweight and a molding property of the fiber composite material 10. The amount of the ultrahigh-strength elongation fibers 23 is preferable to be small as possible within a range that satisfies an effective shock resistance property. The effective shock resistance property can be obtained if the amount of the ultrahigh-strength elongation fibers 23 may be 20% by weight or smaller or 15% by weight or smaller. As a result of enthusiastic study by the present inventor, Charpy impact toughness of the fiber composite material 10 can be improved with a small amount of the ultrahigh-strength elongation fiber 23. Therefore, the lower limit value of the amount of the ultrahigh-strength elongation fiber 23 in the fiber composite material 10 is not specifically determined. For example, if the amount of the ultrahigh-strength elongation fiber 23 is 2% by weight or greater, the fiber composite material 10 is appropriately used for a vehicular interior component. It was found that the fiber composite material 10 including the acid-modified PP exerts the similar shock resistance property as fiber composite material including only non-acid-modified PP (Comparative Example 2) if the amount of the ultrahigh-strength elongation fibers 23 is about 1.8% by weight. Therefore, it may be preferable that the amount of the ultrahigh-strength elongation fiber 23 is about 2% by weight or greater in view of keeping rigidity and effective shock resistance property in the fiber composite material including the acid-modified thermoplastic resin. Furthermore, a lower limit value of the amount of the ultrahigh-strength elongation fibers 23 is preferably 5% by weight or greater and further preferably 9% by weight or greater in view of the lightweight and a shock resistance property of the fiber composite material 10. The amount of the ultrahigh-strength elongation fiber 23 is preferably smaller than that of the plant fibers 21 and is preferably 60% of the content of the plant fibers 21 or smaller.

The ultrahigh-strength elongation fiber 23 has the tensile modulus that is greater than that of the thermoplastic resin 30 and is 4000 MPa or greater. The tensile elongation at break of the ultrahigh-strength elongation fiber 23 is greater than that of the plant fiber 21. The ultrahigh-strength elongation fiber 23 may be an inorganic fiber or an organic fiber as long as it has the tensile modulus and the tensile elongation at break within the above range. Synthetic resin, especially, the thermoplastic resin fiber is preferably used. The tensile elongation at break and the tensile modulus of the thermoplastic resin fiber can be effectively designed in well-balance while considering the nominal tensile strain at break and the tensile modulus of the thermoplastic resin 30, which is the mother material. The ultrahigh-strength elongation fiber 23 preferably may have a melting temperature higher than that of the thermoplastic resin 30 in view of formability or a molding property. Namely, the ultrahigh-strength elongation fiber 23 does not melt at a melting temperature of the thermoplastic resin 30. The ultrahigh-strength elongation fiber 23 that does not melt at a high temperature preferably may have a decomposition temperature higher than the melting temperature of the thermoplastic resin 30.

Examples of the ultrahigh-strength elongation fiber 23 include an ultrahigh-strength polyester fiber (such as an ultrahigh-strength polyethylene terephthalate fiber, hereinafter, referred to as a PET fiber), an aromatic polyamide fiber (such as a meta-aramid fiber), an aliphatic polyamide fiber (such as nylon 66, nylon 6, and nylon 46). The aromatic polyamide fiber that has a higher heat resistance property than the aliphatic polyamide fiber is more preferable as an example of the polyamide fiber. The PET fiber is especially more preferably used than the polyamide fiber that is generally less expensive than the polyamide fiber in view of productivity of the fiber composite material 10. The ultrahigh-strength fiber that has the tensile modulus higher than that of non-strengthened polyethylene terephthalate resin (tensile modulus is about 3000 MPa to 3700 MPa) is preferably used as the PET fiber. Such an ultrahigh-strength fiber having high tensile modulus may be used for an airbag or a seat belt.

The average fiber length, the average fiber diameter and the like of the ultrahigh-strength elongation fibers 23 are not particularly limited. The average fiber length thereof is preferably 10 mm or longer. When the average fiber length of the ultrahigh-strength elongation fibers 23 is in this range, the mixed fibers 20 (the plant fibers 21 and the ultrahigh-strength elongation fibers 23) are easily fiber-mixed (in particular, formation of entanglement of fibers is easy) and are easily mixed with thermoplastic resin fiber 31, which will be described later. The resultant fiber composite material 10 can exert excellent mechanical characteristics. The average fiber length is more preferably in the range from 10 mm to 150 mm, further preferably from 20 mm to 100 mm, and particularly from 30 mm to 70 mm. Further superior advantages can be obtained in these preferable ranges, respectively. The average fiber diameter of the ultrahigh-strength elongation fibers is preferably 1 mm or shorter. When the average fiber diameter of the ultrahigh-strength elongation fibers is in this range, the resultant fiber composite material 10 can exert excellent mechanical characteristics. The average fiber diameter thereof is more preferably in the range from 0.01 mm to 1 mm, further preferably from 0.05 mm to 0.7 mm, and particularly from 0.07 mm to 0.5 mm. Further superior advantages can be obtained in these preferable ranges, respectively. The methods of measuring the average fiber length and the average fiber diameter are same as those used for the plant fiber.

The fineness of the ultrahigh-strength elongation fiber 23 is not particularly limited. The fineness thereof is preferably in the range from 1 dtex to 100 dtex. When the fineness is in the range, the ultrahigh-strength elongation fiber can be easily mixed with a plant fiber, and the both fibers can be more evenly dispersed and contained in the fiber mixture obtained in the fiber-mixing process. The fineness is more preferably in the range from 1 dtex to 50 dtex, further preferably from 1 dtex to 20 dtex, and particularly from 3 dtex to 10 dtex. Further superior advantages can be obtained in these preferable ranges, respectively.

The ultrahigh-strength elongation fiber 23 has the tensile modulus in the range from about 4000 MPa to 20000 MPa, further preferably from about 8000 MPa to 20000 MPa, particularly from about 12000 MPa to 20000 MPa. The upper limit value of the tensile modulus of the ultrahigh-strength elongation fiber 23 is not especially determined. Since the tensile modulus of the fiber composite material 10 is effectively ensured by the plant fiber 21, the tensile modulus of the ultrahigh-strength elongation fiber 23 may be set to a value that is greater than the tensile modulus of the thermoplastic resin 30 and smaller than the tensile modulus of the plant fiber 21 while considering the balance with the tensile elongation at break of the ultrahigh-strength elongation fiber 23. For example, such a value may be a middle of the value greater than tensile modulus of the thermoplastic resin 30 and smaller than the tensile modulus of the plant fiber 21.

The ultrahigh-strength elongation fiber 23 has the tensile elongation at break of preferably 4% or greater, further preferably 10% or greater, and especially preferably 15% or greater. While the ultrahigh-strength elongation fiber 23 having the tensile elongation at break in this range, the tensile elongation at break of the fiber composite material 10 is appropriately improved and eventually the shock resistance property is appropriately improved. The tensile elongation at break of the ultrahigh-strength elongation fiber 23 is within a range of ±5% with reference to the nominal tensile strain at break of the thermoplastic resin 30. Within such a range, the ultrahigh-strength elongation fiber 23 is elongated according to the elongation at a yield point of the thermoplastic resin 30 and therefore, the tensile elongation at break of the fiber composite material 10 is extremely increased.

Next, a method of producing the fiber composite material 10 will be described. The method of producing the fiber composite material 10 includes a fiber mat forming process and a heating process. In the fiber mat forming process, the plant fiber 21, the ultrahigh-strength elongation fiber 23, and the thermoplastic resin fiber 31 made of the thermoplastic resin 30 are subjected to fiber-mixing such that the fiber mat 11 is obtained. In the heating process, the fiber mat 11 is heated at a certain temperature that is a melting temperature of the thermoplastic resin fiber 31 or higher and at which the ultrahigh-strength elongation fiber 23 can keep its fiber state. Fibers that are produced with a known method or commercially available fibers may be used for each of the plant fiber 21, the ultrahigh-strength elongation fiber 23, and the thermoplastic resin fiber 31. The average fiber length and the average fiber diameter, and the fineness of the thermoplastic resin fibers 31 are similar to those of the ultrahigh-strength elongation fibers 23.

The fiber-mixing means mixing the fibers of the plant fibers 21, the ultrahigh-strength elongation fibers 23, and the thermoplastic resin fibers 31 such that the fiber mixture such as a mat-shaped object is obtained. The fiber-mixing method is not particularly limited and various methods may be used. In the present method, a dry method or a wet method is usually used. Among these, a dry method is preferable. In the present method, a dry method enabling simpler production is preferred instead of wet method (such as a dipping method), which requires an advanced drying process because this method uses the plant fiber 21 having a hygroscopicity. Examples of the dry method include an air-laying method, a carding method, and the like. Hereinafter, the fiber mat forming process with the carding method will be described.

Figure 2:
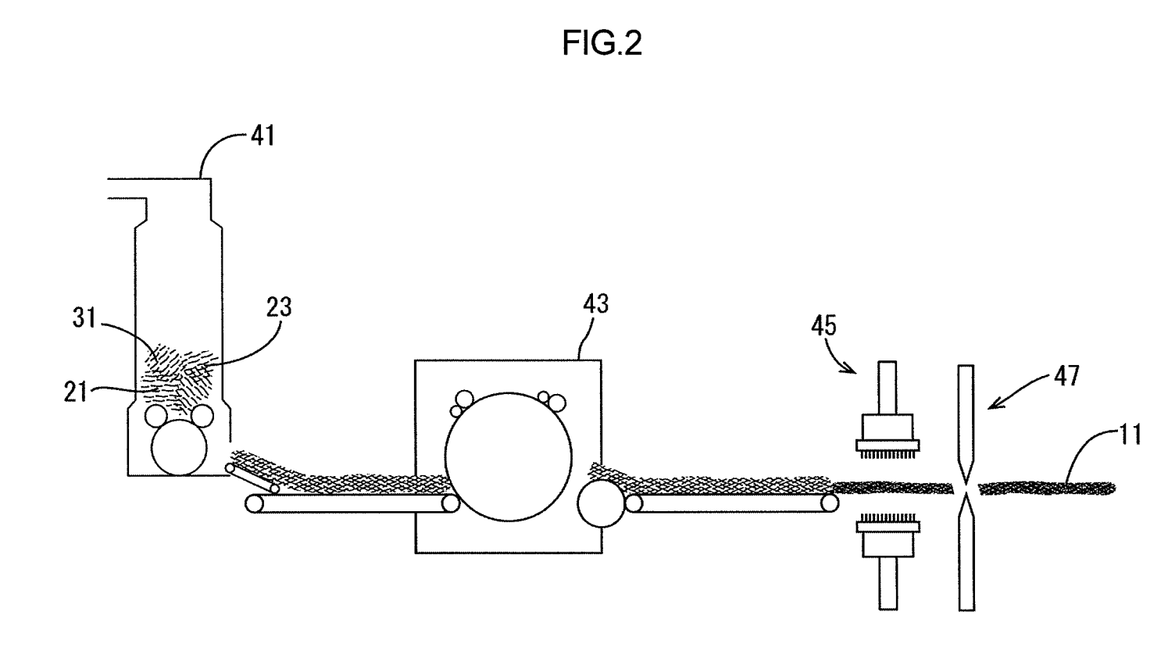
FIG. 2 is a side view illustrating a fiber mat forming process.

As illustrated in FIG. 2, in the fiber mat forming process, the plant fibers 21, the ultrahigh-strength elongation fibers 23, and the thermoplastic resin fibers 31 are mixed at a certain mixing ratio and put in a fiber supply section 41. Each of the plant fibers 21, the ultrahigh-strength elongation fibers 23, and the thermoplastic resin fibers 31 is continuously supplied to a carding device 43 from the fiber supply section 41 and formed into a web. Then, the web is subjected to entangling with entangling means (a needle punch device) 45 and cut with a cutter 47 and the fiber mat 11 is obtained. According to the technology described herein, the fiber composite material 10 includes the ultrahigh-strength elongation fiber 23 to increase the shock resistance property. According to such a configuration, the carding device 43 that is used for producing a fiber composite material of a prior art can be used to form the fiber mat 11.

The density, the fiber areal weight, the thickness and other characteristics of the fiber mat 11 are not particularly limited. In general, the density is 0.3 g/cm$^3$ or lower, and is usually 0.05 g/cm$^3$ or higher, the fiber areal weight is in the range from 400 to 3,000 g/m$^2$, and preferably from 600 to 2,000 g/m$^2$, and the thickness is 10 mm or more, and is usually 50 mm or less, preferably from 10 to 30 mm, and more preferably from 15 to 40 mm. The density is a value measured according to JIS K 7112 (a standard for a method for measuring a density and specific gravity of plastics and non-cellular plastics). The fiber areal weight is a weight per 1 m$^2$ at 10% of water content.

In the heating process, the thermoplastic resin fibers 31 included in the fiber mat 11 are molten and the mixed fibers 20 including the plant fibers 21 and the ultrahigh-strength elongation fibers 23 are bound with each other with the molten thermoplastic resin 30. The heating temperature in the heating process is set to a temperature lower than the melting temperature of the PET fiber if the PET fiber is used as the ultrahigh-strength elongation fiber 23. The heating temperature is preferably set to a temperature minus 5° C. from the melting temperature or lower and more preferably set to a temperature minus 10° C. from the melting temperature or lower to keep the tensile modulus of the PET fiber. If the thermoplastic resin 30 included in the thermoplastic resin fiber 31 is made of polypropylene and maleic anhydride polypropylene, the heating temperature is preferably set to the range from 170° C. to 240° C. and more preferably set to the range from 200° C. to 210° C.

In the heating process, only heating may be performed, but compression is preferably performed at the same time (a hot press forming method) or after the heating (a cold press forming method). The compressing process can bind the mixed fibers 20 more strongly to each other by means of the thermoplastic resin 30 as compared with the case where the compressing process is not performed. The pressure for the compression is not particularly limited and is preferably in the range from 1 MPa to 10 MPa, and more preferably from 1 MPa to 5 MPa. Additionally, when the compressing process is provided, a forming can be performed at the same time. In other words, the material can be formed into a plate shape and other shapes by using a mold die for the compression (heated plates 51, 51 and dies 54, 55 which will be described later). When the material is molded into a plate shape, the product can be used without processing. The molded plate may be further processed by final forming process to obtain a plate shaped pre-board 13 as a final form. In that case, more specifically, the method would comprise a preliminary forming process in which the material is molded into a pre-board and a final forming process in which the material is formed into the final shape. Hereinafter, the heating process with the cold press forming method will be described.

Figure 3A:
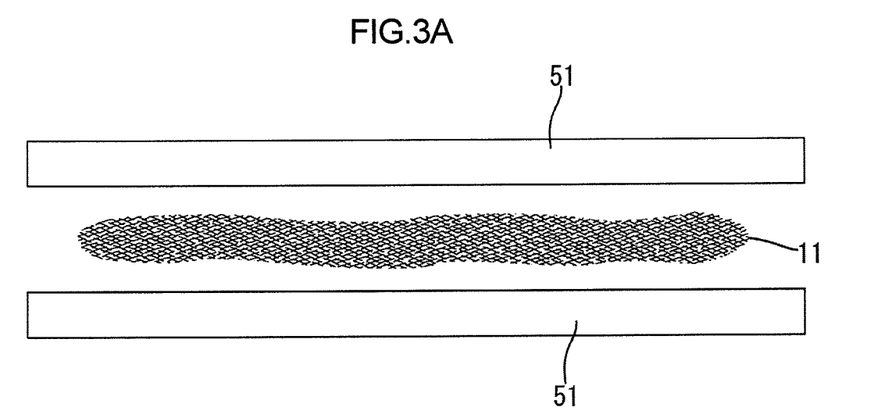
FIG. 3A is a side view illustrating heated plates and a fiber mat between the heated plates.
Figure 3B:
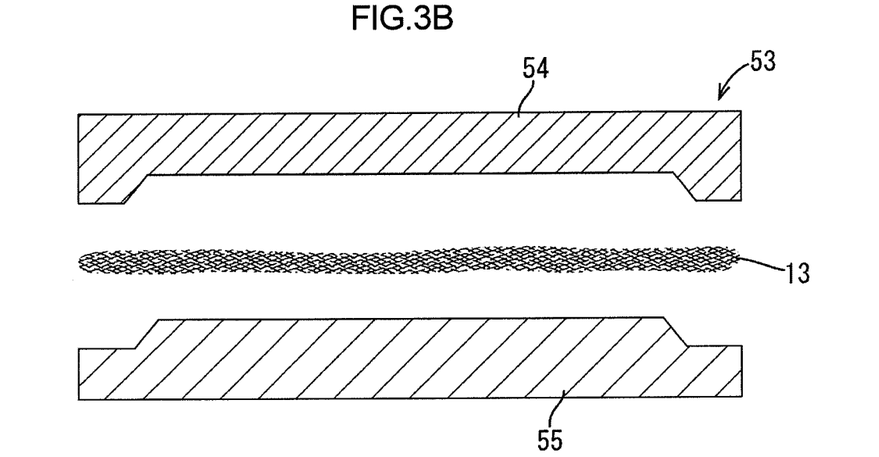
FIG. 3B is a side view illustrating dies and a pre-board between the dies.
Figure 3C:
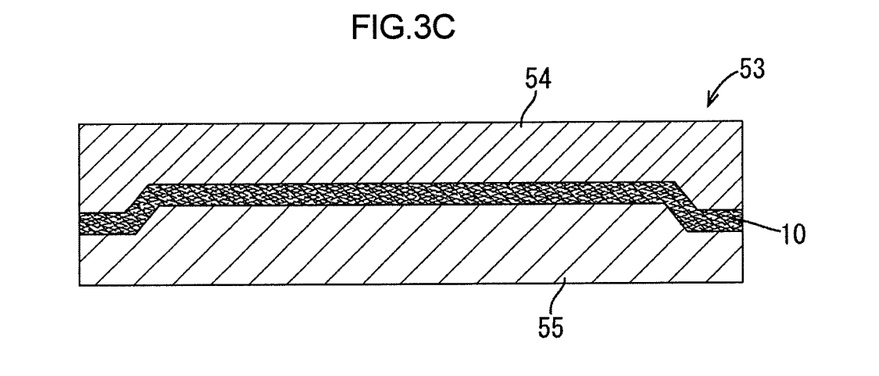
FIG. 3C is a side view illustrating the dies and a fiber composite material between the dies.

As illustrated in FIG. 3A, the fiber mat 11 is placed between the heated plates 51, 51 and heated and compressed by the heated plates 51, 51 and the pre-board 13 is obtained. The thermoplastic resin 30 in the pre-board 13 is molten. As illustrated in FIG. 3B, the pre-board 13 including the molten thermoplastic resin 30 is placed between the die 54 and the die 55 of a molding device 53 and the dies 54 and 55 are closed. Accordingly, the fiber mat 11 is pressed by the die 54 and the die 55 such that the thermoplastic resin 30 in the fiber mat 11 is cooled down and solidified. Then, as illustrated in FIG. 3C, the fiber mat 11 is formed into a shape of a cavity defined by the dies 54 and 55 and the fiber composite material 10 having the shape of the cavity is obtained.

Next, operations and advantageous effects of the technology described herein will be described. According to the technology described herein, the fiber composite material 10 that includes the plant fibers 21 keeps high rigidity, and if the plant fibers 21 are broken, the ultrahigh-strength elongation fiber 23 having greater tensile elongation at break is elongated according to the elongation of the thermoplastic resin 30 and therefore, the tensile elongation at break of the fiber composite material 10 is increased. Thus, the fiber composite material having a good shock resistance property is obtained while keeping the rigidity and improving the tensile elongation at break which are two contrary purposes.

In the technology described herein, the tensile elongation at break of the ultrahigh-strength elongation fiber 23 is within a range of ±5% with reference to the nominal tensile strain at break of the thermoplastic resin 30. The ultrahigh-strength elongation fiber 23 may have the tensile elongation at break that is greater than a value of −5% of the nominal tensile strain at break of the thermoplastic resin. Accordingly, the ultrahigh-strength elongation fiber 23 is effectively elongated according to the elongation of the thermoplastic resin 30 compared to the ultrahigh-strength elongation fiber having the tensile elongation at break smaller than the value of −5% of the nominal tensile strain at break of the thermoplastic resin. Thus, the fiber composite material 10 having such a configuration is obtained. The ultrahigh-strength elongation fiber 23 may have the tensile elongation at break that is smaller than a value of +5% of the nominal tensile strain at break of the thermoplastic resin. Accordingly, the ultrahigh-strength elongation fiber 23 is likely to have effective tensile elongation at break and it is preferable to increase the tensile modulus of the fiber composite material 10.

In the present technology, the amount of the ultrahigh-strength elongation fibers 23 is 30% by weight or smaller based on 100% by weigh of the total amount of the mixed fibers 20 and the thermoplastic resin 30. It is not preferable to reduce the amount of the plant fibers 21 in the fiber composite material 10 to keep the properties of light weight and high rigidity of the fiber composite material 10 including the plant fibers 21. Therefore, in the fiber composite material including the ultrahigh-strength elongation fiber 23 in the amount of 30% by weight or greater, the amount of the thermoplastic resin 30 is necessarily reduced. However, if the amount of the thermoplastic resin 30 is reduced in the fiber composite material 10, the mixed fibers 20 may not be bound effectively with each other with the thermoplastic resin 30 and the formability of the fiber composite material 10 is deteriorated. As a result of enthusiastic study by the present inventor, it is found that the fiber composite material 10 having the effective shock resistance property can be obtained even if the amount of the ultrahigh-strength elongation fibers 23 is 30% by weight or smaller. With the configuration including the ultrahigh-strength elongation fibers 23 in the amount of 30% by weight or smaller, the fiber composite material 10 including the effective amount of the plant fibers 21 and the thermoplastic resin 30 is developed. Namely, according to the above configuration, the fiber composite material 10 having the properties of light weight and high rigidity and an excellent shock resistance property can be obtained while keeping the good formability.

In the present technology, the thermoplastic resin contains an acid-modified thermoplastic resin. Therefore, compared to a fiber composite material including only the thermoplastic resin without containing an acid-modified thermoplastic resin, the binding property of the thermoplastic resin 30 and the plant fibers 21 is improved and the rigidity of the fiber composite material 10 is appropriately improved. Furthermore, the tensile elongation at break of the fiber composite material 10 may be lowered if the binding property of the thermoplastic resin 30 and the plant fibers 21 is high. However, the tensile elongation at break of the fiber composite material 10 is less likely to be lowered since the fiber composite material 10 includes the ultrahigh-strength elongation fibers 23. Accordingly, the rigidity of the fiber composite material 10 is appropriately kept while improving the shock resistance property.

According to the method of producing the fiber composite material 10 of the present technology, the conventional method of producing the fiber composite material without including the ultrahigh-strength elongation fibers 23 is utilized. In the fiber mat forming process, the ultrahigh-strength elongation fibers 23 are added and mixed with the plant fibers 21 and the thermoplastic resin fibers 31, and the heating temperature in the heating process is appropriately set such that the fiber composite material 10 can be produced. Therefore, the fiber composite material 10 having a shock resistance property superior to that of a product produced with the conventional method can be obtained with the same number of producing steps and the similar facilities as those of the prior method. Further, an additional step such as attaching a scattering prevention film on a product is not necessary to be included in a latter step of the conventional producing method to improve the shock resistance property. As a result, the fiber composite material 10 having an excellent shock resistance property can be produced without increasing the number of producing steps.

EXAMPLES

Hereinafter, the present technology will be explained in detail using Examples. However, the present technology is not limited to each of Examples.

(1) Examples 1 to 5

Production of Fiber Composite Materials Having Different Amounts of Ultrahigh-strength Elongation Fibers 50% by weight of kenaf fibers, 5% to 25% by weight of the ultrahigh-strength elongation fibers, and the thermoplastic resin fibers of the residue amount are mixed together assuming that the total amount of the ultrahigh-strength elongation fibers and the thermoplastic resin fibers is defined as 100% by weight, and a fiber mat was produced with the carding method. The kenaf fibers having the average fiber length of 70 mm was used. The ultrahigh-strength elongation fiber having a fineness of 6.6 dtex and the average fiber length of 51 mm was used and a following PET fiber (Examples 1 to 4) or a meta-aramid fiber (Example 5) was used as the ultrahigh-strength elongation fiber. The thermoplastic resin fiber having a fineness of 6.6 dtex and the average fiber length of 51 mm was used and the thermoplastic resin fiber containing the thermoplastic resin containing a following non-acid-modified PP (47.5% by weight)

and an acid-modified PP (2.5% by weight) was used. The content ratio of each fiber in Examples 1 to 5 is illustrated in a table in FIG. 4.

Ultrahigh-strength Elongation Fiber

PET fiber: the tensile modulus is 10000 MPa, the tensile elongation at break is 18%, and the melting temperature is 260° C.

Meta-aramid fiber: the tensile modulus is 8800 MPa, the tensile elongation at break is 40%, and the decomposition temperature is 415° C.

Thermoplastic Resin

Non-acid-modified PP: Product name "NOVATEC SA01" manufactured by Japan Propylene Corp.

Acid-modified PP: Product name "UMEX 1001" manufactured by Sanyo Chemical Ind., Ltd.

The fiber mat obtained in (1) was heated and compressed between the heated plates of 235° C. until an internal temperature of the fiber mat reached 210° C. Thus, a pre-board was obtained and the obtained pre-board including the thermoplastic resin in a molten state was pressed while being cooled down with using a molding device for 60 seconds until an internal temperature reached 25° C. Thus, a fiber composite material board having a fiber areal weight of 1.5 kg/m$^2$ and thickness of about 2.5 mm was obtained.

(2) Comparative Examples 1 and 2

Production of Fiber Composite Material Containing No Ultrahigh-strength Elongation Fibers In Comparative Example 1, a fiber composite material was produced in the same manner as those in (1) above except that an ultrahigh-strength elongation fiber is not mixed. In Comparative Example 2, a fiber composite material was produced in the same manner as those in (1) above except that an ultrahigh-strength elongation fiber is not mixed and a thermoplastic resin is obtained by using only a non-acid-modified PP without containing an acid-modified PP.

(3) Measurement of Tensile Modulus and Tensile Elongation at Break for Fiber Composite Materials according to Examples 1 to 5 and Comparative Examples 1 and 2

For the fiber composite materials obtained in the above (1) and (2), the tensile modulus and the tensile elongation at break were measured according to JIS K 7161. The measurement results are illustrated in the table in FIG. 4.

(4) Measurement of Charpy Impact Toughness for Fiber Composite Materials according to Examples 1 to 5 and Comparative Examples 1 and 2

For the fiber composite materials obtained in the above (1) and (2), Charpy impact toughness was measured according to JIS K 7111-1. The measurement results are illustrated in the table in FIG. 4. In the measurement of Charpy impact toughness, a test piece having a notch (type A) was used and the impact is measured with the edge wise test method.

(5) Evaluation of Shock Resistance Property in Examples 1 to 5 and Comparative Examples 1 and 2

Figure 4:
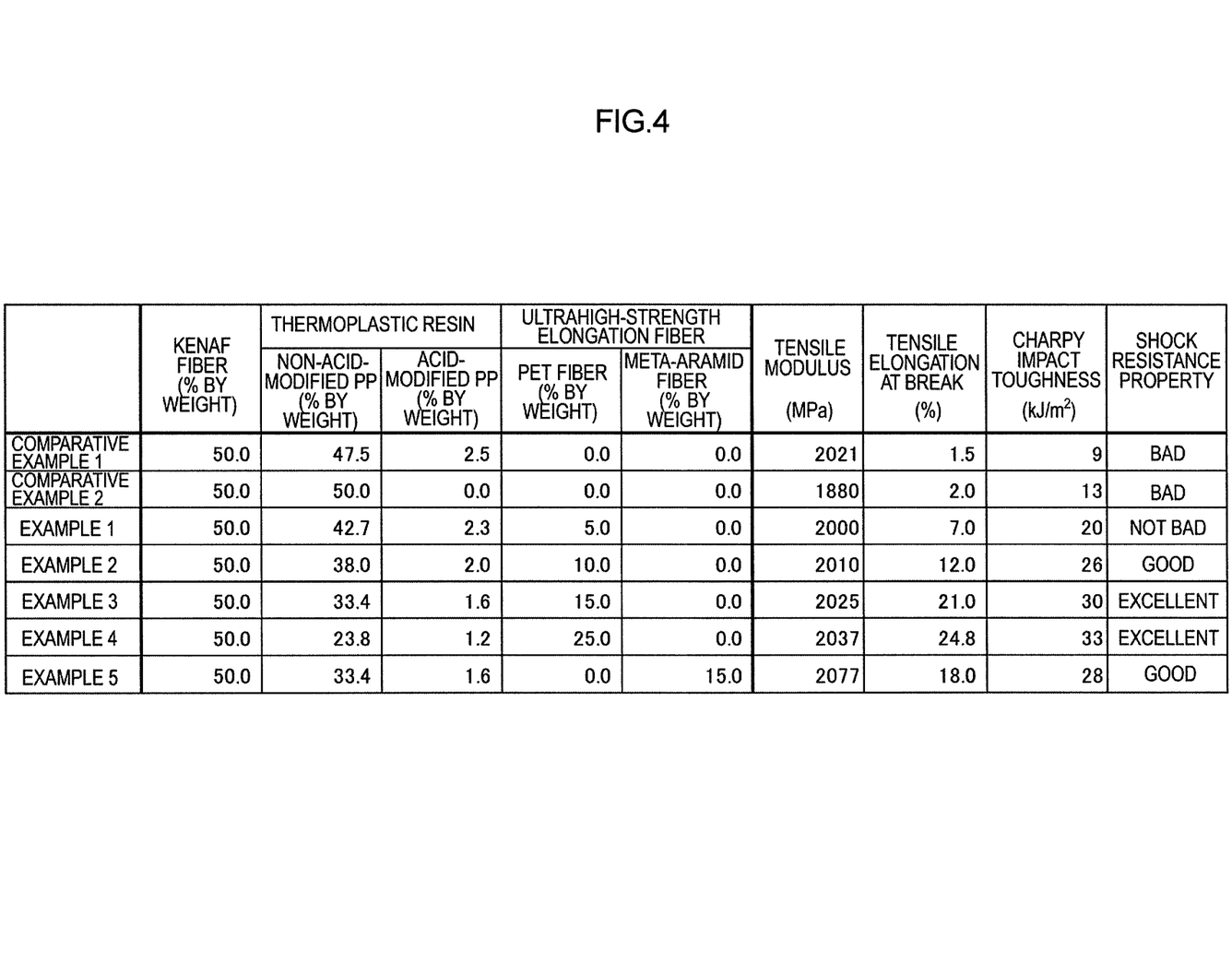
FIG. 4 is a table illustrating tensile modulus, tensile elongation at break, Charpysss impact toughness, and a shock resistance property of fiber composite materials according to Comparative Examples and Examples.

Next, the fiber composite materials obtained in the above (1) and (2) were evaluated for the shock resistance property with reference to the following levels and the evaluation results are illustrated in the table in FIG. 4.

Excellent: Charpy impact toughness is 30 kJ/m$^2$ or more
Good: Charpy impact toughness is 25 kJ/m$^2$ or more and less than 30 kJ/m$^2$ Not bad: Charpy impact toughness is 20 kJ/m$^2$ or more and less than 25 kJ/m$^2$
Bad: Charpy impact toughness is less than 20 kJ/m$^2$ (6) Observations It is confirmed that the tensile modulus is improved and the tensile elongation at break is lowered and Charpy impact toughness is lowered in Comparative Example 1 that includes the acid-modified PP in the thermoplastic resin compared to Comparative Example 2 that includes no acid-modified PP in the thermoplastic resin. It may be assumed that such a result was obtained due to following reasons. Since the binding property of the acid-modified PP and the kenaf fibers is superior to the binding property of the non-acid-modified PP and the kenaf fibers, the binding property of the thermoplastic resin and the kenaf fibers is improved in Comparative Example 1 compared to that in Comparative Example 2. Elongation at the time of receiving a force is an important index for the shock resistance property. In Comparative Example 1, the tensile elongation at break of the fiber composite material is likely to be restricted by the tensile elongation at break of the kenaf fiber compared to Comparative Example 2 and the fiber composite material was broken without utilizing effectively the nominal tensile strain at break of the thermoplastic resin. Accordingly, it is assumed that the Charpy impact toughness was lowered.

On the other hand, in Examples 1 to Example 4, the fiber composite material contains the PET fiber as the ultrahigh-strength elongation fiber. Accordingly, it was confirmed that the tensile elongation at break is extremely improved and the Charpy impact toughness is improved compared to Comparative Example 1. Especially, as is in Example 3 and Example 4, if the content amount of the PET fiber is 15% by weight or more, it was confirmed that the tensile elongation at break and the Charpy impact toughness are greatly improved. Specifically, the tensile elongation at break is ten times of that of Comparative Example 1 or more and the Charpy impact toughness is about 3.5 times of that of Comparative Example 1 or more. Further, even if the content amount of the PET fiber is relatively small such as about 5% by weight in Example 1, it was confirmed that the Charpy impact toughness is twice or more of that of Comparative Example 1. According to the technology described herein, it was confirmed that the shock resistance property of the fiber composite material can be effectively improved while reducing the amount of the thermoplastic resin and without lowering the formability of the fiber composite material.

In Example 5 where the meta-aramid fiber is contained as the ultrahigh-strength elongation fiber, the tensile elongation at break is extremely improved similar to Examples 1 to 4 compared to Comparative Example 1. It was confirmed that the Charpy impact toughness was improved accordingly. Namely, the ultrahigh-strength elongation fiber is not limited to a specific material but may be various kinds of fibers and it was confirmed that the shock resistance property of the fiber composite material may be improved with using various kinds of fibers as the ultrahigh-strength elongation fiber.

OTHER EMBODIMENTS

The technology described herein is not limited to the embodiments described above with reference to the drawings. The following embodiments may be included in the technical scope.

(1) The thermoplastic resin may not include the acid-modified thermoplastic resin. Even in such a configuration, since the fiber composite material includes the ultrahigh-strength elongation fiber, the shock resistance property is improved.

(2) The tensile elongation at break of the ultrahigh-strength elongation fiber may be set as appropriate according to the nominal tensile strain at break of the thermoplastic resin or the tensile elongation at break of the plant fiber.

(3) Other than the above embodiments, the amount of each of the plant fibers, the ultrahigh-strength elongation fibers, and the thermoplastic resin may be altered as appropriate. The fiber composite material may further include a component other than the above.

(4) Other than the above embodiments, the fiber composite material may be produced with various methods with using various materials.

(5) The fiber composite material may be widely used in fields of architectural components in addition to vehicular components. Especially, the fiber composite material is preferably used for an interior material, an exterior material, a structural material of an automobile, a railway car, a ship, an aircraft and others. Among them, an automobile supplies including an interior material for automobile, an instrument panel for automobile, an exterior material for automobile and others is favorable. Specific examples are a door base material, a package tray, a pillar garnish, a switch base, a quarter panel, a core material for armrest, a door trim for automobile, a seat-structured material, a seat back board, a ceiling material, a console box, a dashboard for automobile, various instrument panels, a deck trim, a bumper, a spoiler, a cowling and others. Other examples including an interior material, an exterior material and a structural material of an architectural structure, furniture and others are suitable. That is, a door surface material, a door structural material, a surface material and a structural material for various kinds of furniture (desk, chair, shelf, chest, and others) are included. Additionally a package, a container (tray and others), a member for protection, a member for partition and others may be included.

The invention claimed is:

1. A fiber composite material comprising:
mixed fibers including a plant fiber and an ultrahigh-strength elongation fiber; and
thermoplastic resin that binds the mixed fibers each other, wherein the ultrahigh-strength elongation fiber
is made of one of an ultrahigh-strength polyester fiber and an aliphatic polyamide fiber,
has tensile modulus that is 4000 MPa or greater and is greater than tensile modulus of the thermoplastic resin, and
has tensile elongation at break that is greater than tensile elongation at break of the plant fiber; and
wherein the thermoplastic resin includes acid-modified thermoplastic resin and non-acid modified thermoplastic resin.

2. The fiber composite material according to claim 1, wherein the tensile elongation at break of the ultrahigh-strength elongation fiber is within a range of ±5% with reference to nominal tensile strain at break of the thermoplastic resin.

3. The fiber composite material according to claim 1, wherein the ultrahigh-strength elongation fiber is in an amount of 30% by weight or less based on 100% by weight of a total amount of the mixed fibers and the thermoplastic resin.

4. The fiber composite material according to claim 1, wherein an amount of the ultrahigh-strength elongation fiber is less than that of the plant fibers and is 60% of an amount of the plant fiber or less.

5. The fiber composite material according to claim 3, wherein the amount of the ultrahigh-strength elongation fiber is 2% by weight or greater based on 100% by weight of the total amount of the mixed fibers and the thermoplastic resin.

6. The fiber composite material of claim 5, wherein the amount of the ultrahigh-strength elongation fiber is 15% by weight or less based on 100% by weight of the total amount of the mixed fibers and the thermoplastic resin.

7. The fiber composite material according to claim 1, wherein the ultrahigh-strength elongation fiber has a melting temperature higher than a melting temperature of the thermoplastic resin or has a decomposition temperature higher than the melting temperature of the thermoplastic resin.

8. The fiber composite material according to claim 1, wherein the ultrahigh-strength elongation fiber has the tensile elongation at break of 4% or greater.

9. The fiber composite material of claim 8, wherein the ultrahigh-strength elongation fiber has a tensile elongation at break of 10% or greater.

10. The fiber composite material of claim 9, wherein the ultrahigh-strength elongation fiber has a tensile elongation at break of 15% or greater.

11. The fiber composite material of claim 1,
wherein in the amount of the mixed fibers, the amount of the thermoplastic resin is equal to or greater than the amount of the ultrahigh-strength elongation fiber, and less than the amount of the plant fiber.

12. The fiber composite material of claim 11, wherein the amount of the acid-modified thermoplastic resin is in the range of 0.5% to 15% by weight based on 100% by weight of the total amount of the thermoplastic resin.

13. The fiber composite material of claim 1, wherein the amount of the acid-modified thermoplastic resin is in the range of 0.5% to 15% by weight based on 100% by weight of the total amount of the thermoplastic resin.

14. The fiber composite material of claim 1, wherein the tensile modulus of the ultrahigh-strength elongation fiber is greater than the tensile modulus of the thermoplastic resin and less than the tensile modulus of the plant fiber.

15. A method of producing the fiber composite material according to claim 1, the method comprising:
mixing the plant fiber, the ultrahigh-strength elongation fiber, and thermoplastic resin fiber including the thermoplastic resin and obtaining a fiber mat; and
heating the fiber mat at a heating temperature at which the ultrahigh-strength elongation fiber is kept in a state of a fiber and the heating temperature is a temperature at which the thermoplastic resin fiber is molten or higher; wherein
the ultrahigh-strength elongation fiber is made of one of an ultrahigh-strength polyester fiber and an aliphatic polyamide fiber,
the thermoplastic resin includes acid-modified thermoplastic resin and non-acid modified thermoplastic resin,
the amount of the acid-modified thermoplastic resin is in a range of 0.5% to 15% by weight based on 100% by weight of the total amount of the thermoplastic resin, and the ultrahigh-strength elongation fiber is in a range of 2% by weight to 30% by weight based on 100% by weight of the total amount of the mixed fibers and the thermoplastic resin; and wherein in the amount of the mixed fibers, the amount of the thermoplastic resin is equal to or greater than the amount of the ultrahigh-strength elongation fiber, and smaller than the amount of the plant fiber.

\* \* \* \* \*